July 24, 1956 — D. H. JACOBS ET AL — 2,755,667
MEANS FOR MEASURING FLUID PRESSURE
Filed Nov. 10, 1951
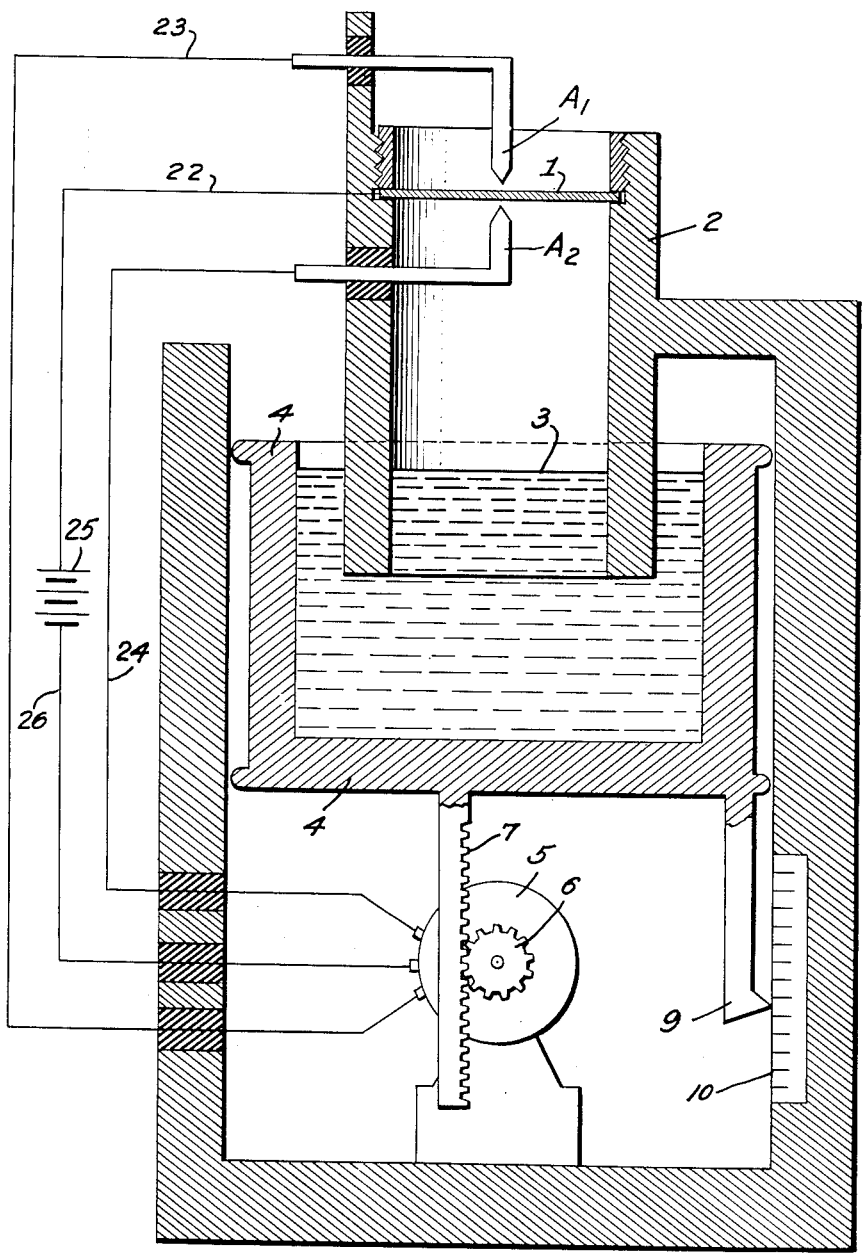
INVENTOR
Donald H. Jacobs
Seymour Scholnick
Marcel A. Martin
BY Donald H. Jacobs
Agent

United States Patent Office 2,755,667
Patented July 24, 1956

2,755,667

MEANS FOR MEASURING FLUID PRESSURE

Donald H. Jacobs, Brookdale, Md., Seymour Scholnick, Washington, D. C., and Marcel A. Martin, Kensington, Md.; said Scholnick and said Martin assignors to said Jacobs Application November 10, 1951, Serial No. 255,772

4 Claims. (Cl. 73—386)

This invention relates to a new and improved system for measuring pressure by a system of balanced pressures. It can be used for measuring barometric pressure, for instance, but obviously is not restricted to that use, since it can be used for measuring any kind of fluid pressure.

Many devices have been used for measuring fluid pressure by means of deformable diaphragms which are so connected as to actuate indicating needles in accordance with the position assumed by the diaphragm when it is distorted by the pressure on it. All of these devices may be fairly accurate at first, but they are subject to the defect that the diaphragm may become unreliable and inaccurate in use, due to the fatigue or "creep" of the material of which it is composed (because of the frequent and sometimes severe distortion to which it is subjected) and because of hysteresis effects.

The present invention avoids this defect hitherto present in instruments which rely on a deformable diaphragm by providing a diaphragm which is subject to very little (almost zero) distortion; yet the invention gives a reading which is accurate to a high degree. It has an extremely long life because it avoids weakening the one essential element of such a pressure measuring instrument, the diaphragm. The diaphragm does not become distorted or weakened because it is so slightly flexed in use.

A null diaphragm per se is not broadly new. Pressure measuring devices have been constructed in the past wherein the diaphragm had only a slight range of movement, but all such devices known to us make use of a metal spring connected to the diaphragm to apply pressure or tension thereto and some means for varying the force exerted by the spring in accordance with the movement of the diaphragm. While such expedients do prolong the life of the diaphragm, they merely transfer the hysteresis and creep or distortion losses to another member, the spring, and this spring is subject to the same defects in accuracy caused by fatigue, hysteresis, etc., as the diaphragm originally was. Our invention removes this source of error (and possible failure) hitherto present in diaphragm-actuated measuring instruments, by substituting a perfect spring for the metal spring (which is subject to distortion). This perfect spring is a constant mass of fluid. Such a material, when used for this purpose, is not subject to deterioration in use. At the same temperature it will always have the same constant effect on the diaphragm. The fluid when kept at a constant temperature is a perfect spring.

The invention is embodied in an instrument in which the pressure to be measured is exerted against a flexible diaphragm which forms one wall of a chamber containing a fluid which automatically applies a counteracting pressure against the other side of the diaphragm and quickly returns it to its normal position after it has been bent only a slight amount.

In the drawing which illustrates, by way of example, a preferred embodiment of the invention, the figure is a schematic view of a fluid pressure measuring instrument and its actuating mechanism.

In the figure, 1 represents a thin diaphragm of any desired material, which is stretched across the upper portion of (and thus is one end of) the inverted cup 2. This cup 2 contains a constant mass of a fluid such as air, and is mounted with its lower end resting in a quantity of mercury (or other liquid) 3, in the upright cup 4. $A_1$ and $A_2$ are electric contacts placed immediately above and below the diaphragm, perhaps a thousandth of an inch from it. Contacts $A_1$, $A_2$, mounted on the cup 2 but insulated from it (if the cup is made of electrically conductive material), are connected to an electric motor 5, arranged to move a pinion 6 in mesh with a rack 7 extending from the bottom of the cup 4. Diaphragm 1 is made of an electrically conducting material, or has such a material fastened to it, with the portions engaged by contacts $A_1$ and $A_2$ connected to wire 22, battery 25, and wire 26, as shown.

In the embodiment shown by way of illustration motor 5 is a two-winding (i. e. reversible) permanent magnet motor, with the leads 23 and 24 from contacts $A_1$ and $A_2$ respectively connected to the two windings and the common point of the two windings connected to the diaphragm (or its electrically conducting part) by wires 22 and 26. Power is supplied by battery 25. Thus when either contact $A_1$ or $A_2$ is touched by the diaphragm, motor 5 and gear 6 will be rotated in one direction or the other to move the cup 4 up or down.

The pressure measuring instrument is arranged with the outer face (i. e. upper face in the figure) of the diaphragm 1 subjected to the pressure which it is desired to measure. A volume of air or other desirable fluid is inclosed in the cup 2 above the mercury. The pressure which is being measured, which is exerted upon the outer face of the diaphragm 1, will tend to bend it inwardly. However, the diaphragm can bend only a slight amount until it engages the contact $A_2$. This, through connection 24 with motor 5, rotates pinion 6 to move cup 4 upwardly, compressing the fluid within cup 2 until the pressure within the cup is the same as on the outer side of the diaphragm when the diaphragm returns to its normal flat position. Should the pressure on the outer face of the diaphragm become less than that in the cup 2, then the diaphragm bends outwardly to engage contact $A_1$ and the motor 5 is actuated through wire 23 in the opposite direction to move the cup 4 downwardly until the pressure within the cup 2 is the same as that on the outer face of the diaphragm. The amount of movement of the cup 4 can be indicated by the pointer 9 moving over the scale 10. Scale 10 can obviously be calibrated in terms of the strength of the pressure on the outer face of the diaphragm 1. The instrument can evidently be used as a manometer or as an altimeter.

Since the diaphragm is kept in balance between contacts $A_1$ and $A_2$, it can never distort enough to show the effects of hysteresis, creep, etc. As the diaphragm is kept in balance by the varying air pressure in cup 2, there is nothing in the pressure balancing system to exhibit creep, distortion, hysteresis, etc.

There are many ways, other than the specific means shown in the drawings, for moving cup 4 to equalize the pressure on the inner side of the diaphragm. The motor used might be A. C. or D. C. and might be thrown into and out of operation or into and out of effective connection with cup 4 or its equivalent by any means well known to those familiar with devices of this kind.

It is within the scope of the invention also to eliminate the contacts entirely and actuate the pressure-equalizing mechanism by any other means which can be actuated by the movement of the diaphragm or the changing pressure within the enclosed chamber.

While we have shown by way of example the means above described for carrying out our invention, it is obvious that the basic features thereof could be embodied in many other structures differing widely from the present disclosure. We, therefore, wish it to be understood that our invention includes all the variations and modifications coming within the scope of the appended claims.

Having thus described our invention, we claim:

1. A device for measuring fluid pressure comprising a cup having a quantity of mercury therein, electrically operated means for moving said cup up and down, an inverted cup positioned in said first cup and having its closed end formed by a flexible diaphragm, a closed chamber formed by said inverted cup and the surface of said mercury, and electrical contacts positioned above and below said diaphragm and connected to control said means for moving said first cup up and down.

2. In a device for measuring fluid pressure, an inverted cup having a wall portion thereof formed by a flexible diaphragm exposed to the pressure to be measured, an upright cup having a quantity of mercury therein, said upright cup being mounted to reciprocate with the open end of the inverted cup inserted in said mercury, a quantity of fluid within said inverted cup above said mercury, contacts positioned on each side of said diaphragm, a motor connected to said contacts, and means operated by said motor for moving said upright cup up and down so as to equalize the pressure on both sides of said diaphragm.

3. Apparatus for measuring fluid pressure comprising a container having a quantity of liquid therein, a second container inverted within said first container and having an open mouth extending into said liquid, said second container having a flexible wall portion above said liquid exposed to an external pressure, electrical contacts positioned on each side of said flexible wall portion so that flexing of said wall portion inwardly or outwardly due to difference in pressure on the sides thereof will cause it to engage one of said contacts, electrical means connected to said contacts and actuated by engagement of said flexible wall portion therewith for moving said containers relative to each other to equalize the pressure on both sides of said flexible wall portion, and a scale and reference means therefor for indicating the amount of such movement.

4. In a device of the class described, an inverted cup having a portion of its wall formed into a flexible diaphragm exposed to a pressure to be measured, a quantity of liquid and a container holding said liquid in position to close the lower open end of said inverted cup, means for moving said container vertically, means adjacent said flexible diaphragm responsive to the movement thereof and connected to the said moving means to control the movement of said container in accordance with the pressure exerted on the outer side of said flexible diaphragm and means for indicating the amount of such movement.

References Cited in the file of this patent

UNITED STATES PATENTS

| 2,620,666 | Schmidt | Dec. 9, 1952 |

FOREIGN PATENTS

| 356,945 | Great Britain | Sept. 17, 1931 |
| 229,452 | Switzerland | Feb. 1, 1944 |
| 938,365 | France | Sept. 13, 1948 |